Figure 1:
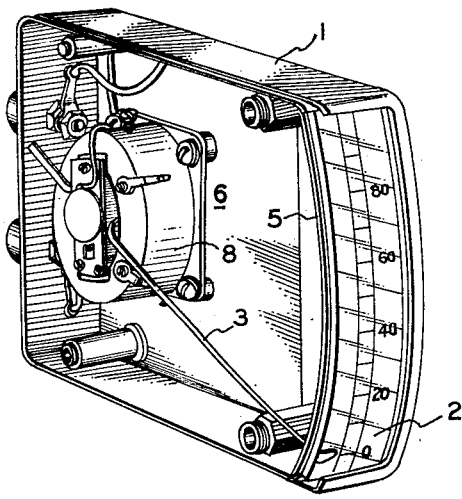

Feb. 11, 1958     H. A. BAKKE     2,823,353
INSTRUMENT BEARING SUSPENSION

Filed Dec. 1, 1954     2 Sheets-Sheet 2

Inventor:
Hans A. Bakke
by, Richard E. Hosley
His Attorney

United States Patent Office 2,823,353
Patented Feb. 11, 1958

2,823,353

INSTRUMENT BEARING SUSPENSION

Hans A. Bakke, Swampscott, Mass., assignor to General Electric Company, a corporation of New York Application December 1, 1954, Serial No. 472,298

4 Claims. (Cl. 324—155)

This invention relates to electrical measuring and indicating instruments and similar devices and has for its principal object the provision of an improved bearing suspension therefor.

The bearing suspension of this invention is particularly useful in one form thereof in electrical meters and instruments involving the use of pivotally mounted coils having electrical leads connected thereto. As is well known, considerable difficulties have existed in the design of the movement suspensions for such instruments particularly in connection with providing electrical connections to the pivotally mounted coil where it has been necessary to provide a number of insulating elements in the form of bushings, washers and the like which contribute to the complexity and cost of the instrument.

In addition to the aforementioned problem, it has long been an objective in the design of devices of this type, particularly in the case of instruments intended for military use, to provide a low cost and rugged shock mounting for resiliently supporting the instrument movement bearings.

In view of the foregoing, it is accordingly one object of this invention to provide an improved bearing suspension for electrical instruments, which improved suspension provides self-contained and electrically insulated means for making electrical connections with the pivotally mounted coil of the instrument.

It is another object of this invention to provide an improved self-contained bearing suspension for an electrical instrument, which suspension includes electrically insulated means for making contact with the instrument coil and which is at the same time provided with a resilient, shock absorbing bearing mounting arrangement.

It is a further object of this invention to provide an improved low cost, resilient bearing mounting arrangement for electrical measuring and indicating instruments and similar devices, which improved arrangement provides a particularly compact and rugged design.

Briefly stated, in accordance with one aspect of this invention as embodied in an electrical instrument, each of the instrument movement mounting bearings is mounted in a flanged bearing cup which is in turn molded into a support formed of a resilient, electrically insulating material such as butyl rubber. In the same operation, the resilient bearing support is molded around a supporting plate which is in turn adjustably mounted on the instrument framework in a position to support one spindle of the instrument coil structure. A similar resilient support is employed to support the spindle at the opposite side of the coil structure.

The opposite ends of the coil itself are electrically connected to the two spindles respectively and suitable electrical connections are made with the spindles to allow energization of the coil. In the present embodiment, a pair of control springs connected respectively to the two spindles serve as electrical connections to the spindles and are anchored at their outer ends on rotatably adjustable washers which are also supported on the insulating resilient bearing supports.

It will be seen that with the aforementioned arrangement, the entire pivotally mounted coil structure, including the electrical connections thereto, is electrically insulated from the instrument structure by the insulating material in which the support bearings are embedded. Further the bearings are yieldably or resiliently supported so as to minimize the possibility of damage due to rapid movements and shocks. In addition the flanged cup structure prevents any tendency of the bearing to cock or deflect angularly from the desired position while still obtaining the advantage of a resilient mounting in a low cost, compact and rugged structure.

Other objects and advantages of this invention will be apparent from the following description taken in connection with the accompanying drawings, and its scope will be pointed out in the appended claims.

Figure 2:
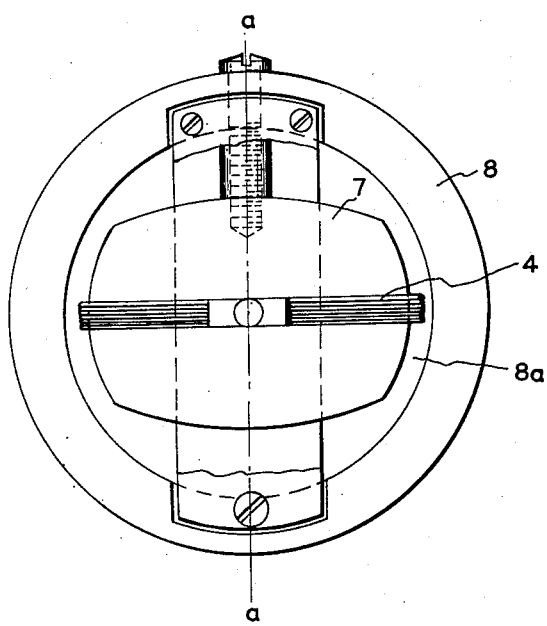
Figure 3:
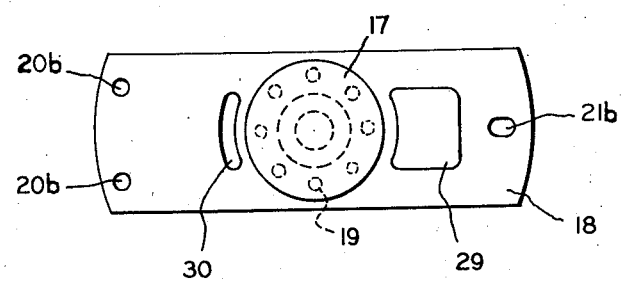

Referring to the drawings, Fig. 1 is a perspective cutaway view of an instrument embodying this invention; Fig. 2 is a side view of a portion of the movement of the instrument shown in Fig. 1; Fig. 3 is a detached view of one of the movement bearing support plates; while Fig. 4 is a cross sectional view of the instrument movement taken along the lines a—a as shown in Fig. 2.

Referring to Fig. 1, the instrument shown is of the type which may be referred to as a vertical edgewise instrument and comprises an outer casing 1 and a dial cover 2 which together form an enclosure for the internal mechanism of the instrument. A pointer 3 is attached in any well known manner so as to be deflectable with a pivotally mounted rectangularly shaped coil 4, which is visible in Figs. 2 and 4. The pointer 3 is mounted so as to be registrable with a calibrated scale 5 as shown in Fig. 1.

Figure 4:
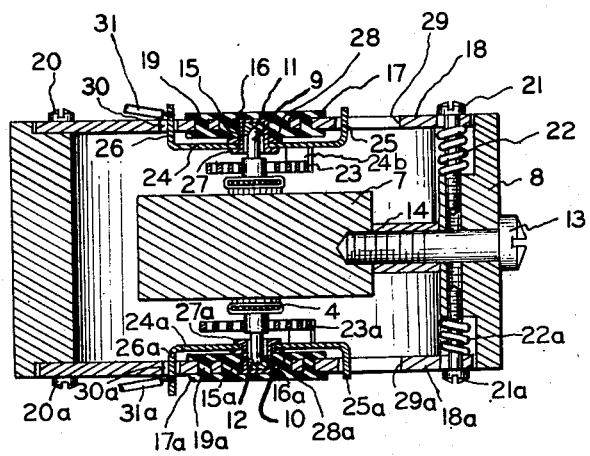

The instrument movement, which is shown at 6 in Fig. 1 and in more detail in Figs. 2 and 4, is of the internal magnet type in which a permanent magnet 7 is mounted within the deflectable coil 4 which is in turn encircled by an outer yoke 8 of magnetic material forming a return path for the magnetic field set up by the magnet 7. An air gap 8a is thus formed between the magnet 7 and the yoke 8 and the coil 4 is mounted so that the edge portions thereof are deflectable in the magnetic field set up in the air gap 8a by the magnet 7. Current flowing in the coil 4 thus produces a torque tending to cause angular deflection of the coil and its associated pointer 3. The basic principles of operation of instruments of this type are well known in the art and do not require further explanation.

It will be seen that the deflectable coil assembly of the present embodiment is formed in a conventional manner with the rectangularly shaped coil 4 having a pair of spindles or shaft sections 9 and 10 attached thereto at diametrically opposite points as shown. This coil assembly is pivotally supported on a pair of jewel bearings 11 and 12. The permanent magnet 7 is supported within the coil by means of a screw 13 and a spacer 14 both preferably formed of a non-magnetic material.

It is well known that in order to minimize frictional drag on a pivotally mounted assembly, such as that shown, it is necessary to minimize the contact area between the coil supporting spindles and their respective bearings. Such minimization of the bearing contact area results in very high mechanical stresses in the bearings, which high stresses tremendously increase the susceptibility of the bearings to being shattered or cracked as a result of shock loadings. Such problems have been particularly of concern in military applications where mechanical shocks are common in the operation of this type of equipment.

Further, as has been previously pointed out, the problems existing in connection with making electrical connections to the pivotally mounted coil have in the past required a rather extensive use of insulating bushings, washers and the like in order to insulate the coil circuit from the remaining structure of the instrument. The present invention provides, among other advantages, a bearing suspension which overcomes the aforementioned problems.

Referring now to the particular embodiment shown, it will be seen that the bearing 11 is supported in a bearing cup 15 which, as shown in Fig. 4, is provided with a flange portion 16 thereon. The bearing cup 15 is embedded in a supporting member 17 of a molded resilient and electrically insulating material such as butyl rubber. The member 17 may be formed of any resilient, electrically insulating material although the other well known properties of butyl rubber make it a preferable material for the application which the present embodiment was designed to fulfill.

The supporting member 17 is molded directly into place on a mounting member or plate 18, which is also shown in Fig. 3. The plate 18 is provided with a series of apertures 19 through which the molded support member 17 extends so as to be firmly attached to the plate 18. In the same operation the support member 17 is molded around a portion of the bearing cup 15 as shown in Fig. 4, with the flanged portion 16 on the bearing cup serving as a means for improving the stability of the bearing cup support. In other words, the flange 16 reduces the tendency of the bearing cup 15 to tilt or cock at an angle to the axis of rotation of the coil assembly without adversely affecting the resiliency of the mount along the axis of the mount.

The mounting plate 18 is supported on the yoke 8 by means of a pair of screws 20 which are threaded directly into the yoke through a pair of apertures 20b in the plate 18. The plate 18 is adjustable against its own resiliency through the agency of a screw 21 which extends through an aperture 21b in the plate 18 and which operates against a spring 22 as shown in Fig. 4.

In addition to providing a resilient, shock absorbing support, the member 17 also provides electrical insulation between the electrical connections to the coil assembly and the remaining structure of the instrument as will be now described. In the present embodiment, one side of the coil 4 is electrically connected to the spindle 9 which is in turn attached to the inner end of a control spring 23. The control spring 23 therefore serves not only to provide a resilient restraining force against deflection of the coil assembly but also provides means for making an electrical connection to one side of the coil 4.

A washer 24, having tab portions 25 and 26 is secured to the bearing support 17 under a lip portion 27 provided on the bearing cup 15. The washer 24 is clamped against a separator washer 28 and the outer end of the control spring 23 is attached thereto so that the force exerted by the spring may be adjusted by rotation of the washer 24 against the frictional restraint of the clamping force. In the embodiment shown, the spring 23 is attached to a post 24b extending down from the washer 24. The tab 25 extends through an aperture 29 in the plate 18 so as to provide a convenient means for rotatively adjusting the washer 24. The tab 26 extends through a second aperture 30 in the plate 18 and provides a terminal to which an electrical lead 31 may be attached to form a circuit through the washer 24, the control spring 23 and the spindle 9 to one end of the coil 4.

In the present embodiment, the arrangement for supporting the opposite spindle 10 is the same as that just described and similar elements thereof are identified by corresponding numerals followed in each case by the letter "a." Electrical connection to the opposite end of the coil 4 is made through the spindle 10, the control spring 23a, the washer 24a and the tab 26a to the lead 31a.

It will be seen that with the arrangement just described, it is unnecessary to provide any additional insulation in the form of washers, bushings and the like, as has been the case heretofore. In addition, the bearings are resiliently mounted so as to absorb shock loadings while at the same time, the provision of the flanged mounting cups 15 and 15a reduces the tendency of the mount to be angularly resilient with respect to the axis of the coil assembly. It will be observed also that the bearing mounting arrangement of the present invention is physically compact in size and can be manufactured and assembled simply and inexpensively.

What I claim as new and desire to secure by Letters Patent of the United States is:

1. A bearing suspension for an electrical instrument of the type having a pivotally mounted coil assembly deflectable against a spring with said spring being electrically connected to one end of said coil through a mounting spindle on said coil, said suspension comprising a bearing mounting member supported on the structure of said instrument, a substantially flat disk-like bearing support formed of a resilient, electrically insulating material attached to said mounting member, a bearing mounted in said resilient insulating support and engageable with one end of said spindle, and means supported on said bearing support for securing the end of said control spring and thereby provide an electrically insulated connection to said spring and one end of said coil, said bearing support functioning to absorb both axial and lateral vibrations of said spindle.

2. A bearing suspension for a pivotally mounted coil assembly comprising a bearing mounting plate supported on the structure of said instrument, a bearing cup adapted to receive a bearing therein and having a flange portion extending transversely from the exterior surface thereof, a substantially flat disk-like bearing support formed of a resilient, electrically insulating material molded about portions of said plate and said cup so as to envelop a portion of the exterior of said cup including said flange portion and form a unitary structure including said plate, said resilient support and said cup, the open end of said cup being exposed so as to be capable of receiving a bearing therein, a bearing in said cup engageable with the end of a spindle on said coil assembly, and means supported on said resilient insulating support for securing the end of a control spring on said spindle and thereby provide an electrically insulated connection thereto, said bearing support functioning to absorb both axial and lateral vibrations of said spindle.

3. A bearing suspension as claimed in claim 2 wherein said spring is connected to a frictionally restrained rotatable member supported by said resilient insulating support, said rotatable member including at least one tab extending through a passageway in said bearing mounting plate and adapted to provide an electrical connection to said coil on the side of said bearing mounting plate opposite said coil assembly and to allow the selective adjustment of the tension of said spring.

4. A bearing suspension for a pivotally mounted coil assembly comprising a bearing mounting plate adjustably mounted on the structure of said instrument so as to enable adjustment in a direction substantially parallel to the pivotal axis of said coil assembly and containing a plurality of passageways extending through the plate in a direction substantially parallel to the pivotal axis of said coil assembly, a bearing cup adapted to receive a bearing therein and having a flange portion extending transversely to the pivotal axis of said coil assembly, an electrically insulating substantially flat disk-like resilient bearing support molded about portions of said plate and said cup and enveloping a portion of the exterior of said cup including said flange portion, said resilient insulating material passing through said passageways and forming a unitary structure including said plate, said resilient support and said cup, a bearing in said cup engageable with the end of a spindle on said coil assembly, and a spring electrically connected through said mounting spindle to one end of said coil and supported on said insulating support so as to resiliently restrain the deflection of said coil assembly, said bearing support functioning to absorb both axial and lateral vibrations of said spindle.

References Cited in the file of this patent

UNITED STATES PATENTS

| | | |
|---|---|---|
| 797,517 | Kimball | Aug. 15, 1905 |
| 1,695,422 | Grisdale | Dec. 18, 1928 |
| 2,551,621 | Michelsen | May 8, 1951 |
| 2,626,296 | Side | Jan. 20, 1953 |
| 2,708,609 | Triplett | May 17, 1955 |

FOREIGN PATENTS

| | | |
|---|---|---|
| 443,218 | Germany | Apr. 19, 1927 |
| 867,743 | France | Sept. 1, 1941 |